(12) United States Patent
Evans et al.

(10) Patent No.: US 8,738,929 B2
(45) Date of Patent: May 27, 2014

(54) AUXILIARY FUNCTIONALITY FOR PIXEL DATA

(75) Inventors: Glenn F. Evans, Kirkland, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/411,272

(22) Filed: Mar. 2, 2012

(65) Prior Publication Data

US 2012/0166816 A1 Jun. 28, 2012

Related U.S. Application Data

(63) Continuation of application No. 10/178,804, filed on Jun. 24, 2002, now Pat. No. 8,155,314.

(51) Int. Cl.
*H04L 29/06* (2006.01)
(52) U.S. Cl.
USPC .......................................................... 713/189
(58) Field of Classification Search
USPC ......................................... 713/189, 162, 165
See application file for complete search history.

(56) References Cited

U.S. PATENT DOCUMENTS

| | | | |
|---|---|---|---|
| 4,757,534 A | 7/1988 | Matyas et al. | |
| 4,962,533 A | 10/1990 | Krueger | |
| 5,297,206 A | 3/1994 | Orton | |
| 5,321,749 A | 6/1994 | Virga | |
| 5,379,344 A | 1/1995 | Larsson et al. | |
| 5,537,467 A * | 7/1996 | Cheng et al. | 379/211.02 |
| 5,572,235 A | 11/1996 | Mical et al. | |
| 5,577,125 A * | 11/1996 | Salahshour et al. | 380/54 |
| 5,627,987 A * | 5/1997 | Nozue et al. | 711/200 |
| 5,727,062 A | 3/1998 | Ritter | |
| 5,825,877 A | 10/1998 | Dan et al. | |
| 5,825,879 A | 10/1998 | Davis | |
| 5,881,287 A | 3/1999 | Mast | |
| 5,898,779 A | 4/1999 | Squilla et al. | |

(Continued)

FOREIGN PATENT DOCUMENTS

| | | |
|---|---|---|
| CN | 1432923 | 7/2003 |
| CN | 101441694 | 5/2009 |

(Continued)

OTHER PUBLICATIONS

"BPAI Decision", U.S. Appl. No. 10/178,804, (Jul. 11, 2011), 7 pages.

(Continued)

*Primary Examiner* — Ali Abyaneh
(74) *Attorney, Agent, or Firm* — Carole Boelitz; Micky Minhas; Wolfe-SBMC

(57) ABSTRACT

The various methods and systems described herein are directed to supplying a secure channel for software executing on a host computer. The methods and systems address and provide solutions for an attack model in which rogue software executing on the host computer attempts to inappropriately obtain or otherwise manipulate data. Some embodiments can provide pixel data that can be kept confidential (in that untrusted software applications cannot read the data off of the display screen). In addition, other embodiments can preserve the integrity of the pixel data by detecting whether the pixel data has been inappropriately manipulated. Various embodiments are based on a decryption engine that is located on a video card very late in the video processing chain such that programmatic access to decrypted pixel data is denied.

20 Claims, 11 Drawing Sheets

(56) References Cited

U.S. PATENT DOCUMENTS

| | | | |
|---|---|---|---|
| 5,963,909 A | 10/1999 | Warren et al. | |
| 6,044,182 A | 3/2000 | Daly et al. | |
| 6,044,187 A * | 3/2000 | Duck et al. | 385/33 |
| 6,047,342 A | 4/2000 | Depew | |
| 6,055,314 A | 4/2000 | Spies et al. | |
| 6,064,739 A * | 5/2000 | Davis | 380/200 |
| 6,064,764 A * | 5/2000 | Bhaskaran et al. | 382/183 |
| 6,072,873 A * | 6/2000 | Bewick | 380/217 |
| 6,115,819 A | 9/2000 | Anderson | |
| 6,246,768 B1 * | 6/2001 | Kim | 380/28 |
| 6,330,624 B1 | 12/2001 | Cromer et al. | |
| 6,408,390 B1 | 6/2002 | Saito | |
| 6,421,733 B1 | 7/2002 | Tso et al. | |
| 6,424,430 B1 * | 7/2002 | Bilodeau et al. | 358/1.2 |
| 6,731,756 B1 | 5/2004 | Pizano et al. | |
| 6,859,832 B1 | 2/2005 | Gecht et al. | |
| 6,865,431 B1 | 3/2005 | Hirota et al. | |
| 6,934,389 B2 | 8/2005 | Strasser et al. | |
| 7,024,558 B1 | 4/2006 | Satake | |
| 7,047,305 B1 * | 5/2006 | Brooks et al. | 709/231 |
| 7,055,038 B2 * | 5/2006 | Porter et al. | 713/193 |
| 7,065,651 B2 | 6/2006 | Evans | |
| 7,096,204 B1 | 8/2006 | Chen et al. | |
| 7,197,648 B2 | 3/2007 | Evans | |
| 7,202,875 B2 | 4/2007 | Foehr et al. | |
| 7,206,940 B2 | 4/2007 | Evans et al. | |
| 7,233,619 B1 * | 6/2007 | Roman | 375/240 |
| 7,272,726 B2 | 9/2007 | Evans | |
| 7,284,135 B2 | 10/2007 | Evans et al. | |
| 7,293,178 B2 | 11/2007 | Evans et al. | |
| 7,299,365 B2 | 11/2007 | Evans | |
| 7,302,586 B2 | 11/2007 | Evans | |
| 7,337,328 B2 | 2/2008 | Evans | |
| 7,337,329 B2 | 2/2008 | Evans | |
| 8,155,314 B2 | 4/2012 | Evans | |
| 2002/0012432 A1 | 1/2002 | England et al. | |
| 2002/0103964 A1 | 8/2002 | Igari | |
| 2002/0136408 A1 | 9/2002 | Garcia | |
| 2002/0163522 A1 | 11/2002 | Porter | |
| 2002/0169979 A1 | 11/2002 | Zimmer | |
| 2003/0017846 A1 | 1/2003 | Estevez et al. | |
| 2003/0026421 A1 * | 2/2003 | Morlet | 380/203 |
| 2003/0059047 A1 | 3/2003 | Iwamura | |
| 2003/0093683 A1 * | 5/2003 | Wong et al. | 713/189 |
| 2003/0135742 A1 | 7/2003 | Evans | |
| 2003/0235304 A1 | 12/2003 | Evans et al. | |
| 2004/0109563 A1 | 6/2004 | Evans | |
| 2004/0111627 A1 | 6/2004 | Evans | |
| 2005/0102264 A1 | 5/2005 | Nason et al. | |
| 2005/0102266 A1 | 5/2005 | Nason et al. | |
| 2005/0125619 A1 | 6/2005 | Evans | |
| 2005/0154902 A1 | 7/2005 | Evans | |
| 2005/0160285 A1 | 7/2005 | Evans | |
| 2005/0166042 A1 | 7/2005 | Evans | |
| 2005/0204165 A1 * | 9/2005 | Nason et al. | 713/201 |
| 2006/0123248 A1 | 6/2006 | Porter et al. | |
| 2006/0126849 A1 | 6/2006 | Shirakawa et al. | |

FOREIGN PATENT DOCUMENTS

| | | |
|---|---|---|
| EP | 1345435 | 9/2003 |
| IN | 245726 | 1/2011 |
| JP | 09259044 | 10/1997 |
| JP | 10293722 | 11/1998 |
| JP | 2001103280 | 4/2001 |
| JP | 2003289500 | 10/2003 |
| JP | 2009283007 | 12/2009 |
| JP | 4504623 | 7/2010 |
| WO | WO-0225416 | 3/2002 |

OTHER PUBLICATIONS

"EPO Decision to Grant", Application No. 3000543.3, (Jul. 2, 2009), 3 pages.

"EPO Intent to Grant", Application No. 03000543.3, (Feb. 5, 2009), 7 pages.

"Final Office Action", U.S. Appl. No. 10/178,804, (Feb. 4, 2008), 27 pages.

"Final Office Action", U.S. Appl. No. 10/178,804, (Sep. 8, 2006), 19 pages.

"First Office Action", Chinese Application No. 200810179584.8, (Jan. 22, 2010), 8 pages.

"Foreign Office Action", Application Serial No. 03010393.1, (Jul. 16, 2009), 2 pages.

"Foreign Office Action", Application Serial No. 20032888, (Dec. 22, 2008), 6 pages.

"High-bandwidth Digital Content Protection System, Revision 1.0", *Intel Corporation*, Hillsboro, OR 97124, XP002305414—Retrieved from the Internet URL—http://www.digital-cp.com/data/HDCP10.pdf, (Feb. 17, 2000), 60 pages.

"Minutes of Oral Proceedings", Application Serial No. 03000543.3, (Jan. 30, 2009), 17 pages.

"Non-Final Office Action", U.S. Appl. No. 10/178,804, (Jan. 9, 2007), 23 pages.

"Non-Final Office Action", U.S. Appl. No. 10/178,804, (Dec. 13, 2005), 18 pages.

"Notice of Acceptance", Application Serial No. 2003204378, (May 7, 2009), 3 pages.

"Notice of Allowance", U.S. Appl. No. 10/178,804, (Dec. 5, 2011), 7 pages.

"Second Office Action", Chinese Application No. 200810179584.8, (May 11, 2010), 7 pages.

Choudhury, Abhijit K., et al., "Copyright Protection for Electronic Publishing Over Computer Networks", IEEE Network, May/Jun. 1995,(May 2005), pp. 12-20.

"Advisory Action", U.S. Appl. No. 10/314,896, (Feb. 6, 2007),3 Pages.

"Advisory Action", U.S. Appl. No. 10/631,023, (Apr. 5, 2007),3 Pages.

"Corrected Notice of Allowance", U.S. Appl. No. 11/044,441, (Oct. 24, 2007),3 Pages.

"Final Office Action", U.S. Appl. No. 10/052,840, (Dec. 19, 2005),10 Pages.

"Final Office Action", Application No. 10/178,822, (Jun. 26, 2006),15 pages.

"Final Office Action", U.S. Appl. No. 10/314,896, (Nov. 17, 2006), 38 Pages.

"Final Office Action", U.S. Appl. No. 10/631,023, (Dec. 7, 2006), 56 Pages.

"Final Office Action", U.S. Appl. No. 11/044,110, (Feb. 12, 2007),11 Pages.

"Final Office Action", U.S. Appl. No. 11/044,765, (Jul. 5, 2006),12 Pages.

"First Examination Report", IN Application No. 1146/MUM/2002, (Apr. 12, 2007), 2 pages.

"Foreign Office Action", EP Application No. 03000543.3, (Jul. 12, 2005), 4 Pages.

"Foreign Office Action", EP Application No. 03000543.3, (Oct. 2, 2006), 4 Pages.

"Foreign Office Action", JP Application No. 2003-006414, (May 19, 2009), 23 Pages.

"Foreign Notice of Allowance", CN Application No. 200810179584.8, (Jun. 16, 2011), 2 pages.

"Foreign Notice of Allowance", IN Application No. 1146/MUM/2002, (Apr. 8, 2008),1 page.

"Foreign Notice of Allowance", JP Application No. 2009-190334, (Jul. 15, 2011), 4 pages.

"Foreign Office Action", CN Application No. 03103302.4, (Mar. 14, 2008), 4 pages.

"Foreign Office Action", CN Application No. 03103302.4, (Apr. 7, 2006), 30 pages.

"Foreign Office Action", CN Application No. 03103302.4, (Oct. 20, 2006),11 pages.

"Foreign Office Action", IN Application No. 1146/MUM/2002, (Feb. 22, 2008),1 page.

"Foreign Office Action", JP Application No. 2009-190334, (Apr. 21, 2011),14 pages.

(56) References Cited

OTHER PUBLICATIONS

"Non-Final Office Action", U.S. Appl. No. 10/052,840, (Jun. 24, 2005), 8 Pages.
"Non-Final Office Action", U.S. Appl. No. 10/178,822, (Mar. 2, 2006), 13 pages.
"Non-Final Office Action", U.S. Appl. No. 10/178,822, (Sep. 28, 2006), 20 pages.
"Non-Final Office Action", U.S. Appl. No. 10/314,896, (May 24, 2007), 32 Pages.
"Non-Final Office Action", U.S. Appl. No. 10/314,896, (Jun. 29, 2006), 32 Pages.
"Non-Final Office Action", U.S. Appl. No. 10/631,023, (Jun. 29, 2006), 44 Pages.
"Non-Final Office Action", U.S. Appl. No. 11/044,110, (May 4, 2006), 7 Pages.
"Non-Final Office Action", U.S. Appl. No. 11/044,110, (Aug. 22, 2006), 8 Pages.
"Non-Final Office Action", U.S. Appl. No. 11/044,441, (Jul. 3, 2007), 8 Pages.
"Non-Final Office Action", U.S. Appl. No. 11/044,442, (May 31, 2007), 8 Pages.
"Non-Final Office Action", U.S. Appl. No. 11/044,483, (Jun. 14, 2007), 6 pages.
"Non-Final Office Action", U.S. Appl. No. 11/044,765, (Jan. 5, 2006), 7 Pages.
"Non-Final Office Action", U.S. Appl. No. 11/045,623, (Jun. 4, 2007), 7 Pages.
"Notice of Allowance", U.S. Appl. No. 10/052,840, (Mar. 8, 2006), 9 Pages.
"Notice of Allowance", U.S. Appl. No. 10/178,822, (Dec. 7, 2006), 6 pages.
"Notice of Allowance", U.S. Appl. No. 10/314,896, (Sep. 20, 2007), 12 Pages.
"Notice of Allowance", U.S. Appl. No. 10/631,023, (Aug. 9, 2007), 11 Pages.
"Notice of Allowance", U.S. Appl. No. 11/044,110, (Jun. 8, 2007), 8 Pages.
"Notice of Allowance", U.S. Appl. No. 11/044,441, (Sep. 21, 2007), 9 Pages.
"Notice of Allowance", U.S. Appl. No. 11/044,442, (Sep. 20, 2007), 9 Pages.
"Notice of Allowance", U.S. Appl. No. 11/044,483, (Sep. 6, 2007), 8 Pages.
"Notice of Allowance", U.S. Appl. No. 11/044,765, (Sep. 20, 2006), 13 pages.
"Notice of Allowance", U.S. Appl. No. 11/044,765, (Dec. 15, 2006), 4 Pages.
"Notice of Allowance", U.S. Appl. No. 11/045,623, (Sep. 25, 2007), 9 Pages.
Altova, "XML Spy 4.0 Manual", 1998-2001 *Altova Inc. & Altova GmbH*, (Sep. 10, 2001), pp. 1-90, 343-362.
"Summons to Attend Oral Proceedings", EP Application No. 03000543.3, Jul. 15, 2008, 5 Pages.
"Foreign Office Action", JP Application No. 2003-006414, Oct. 16, 2009, 5 pages.

* cited by examiner

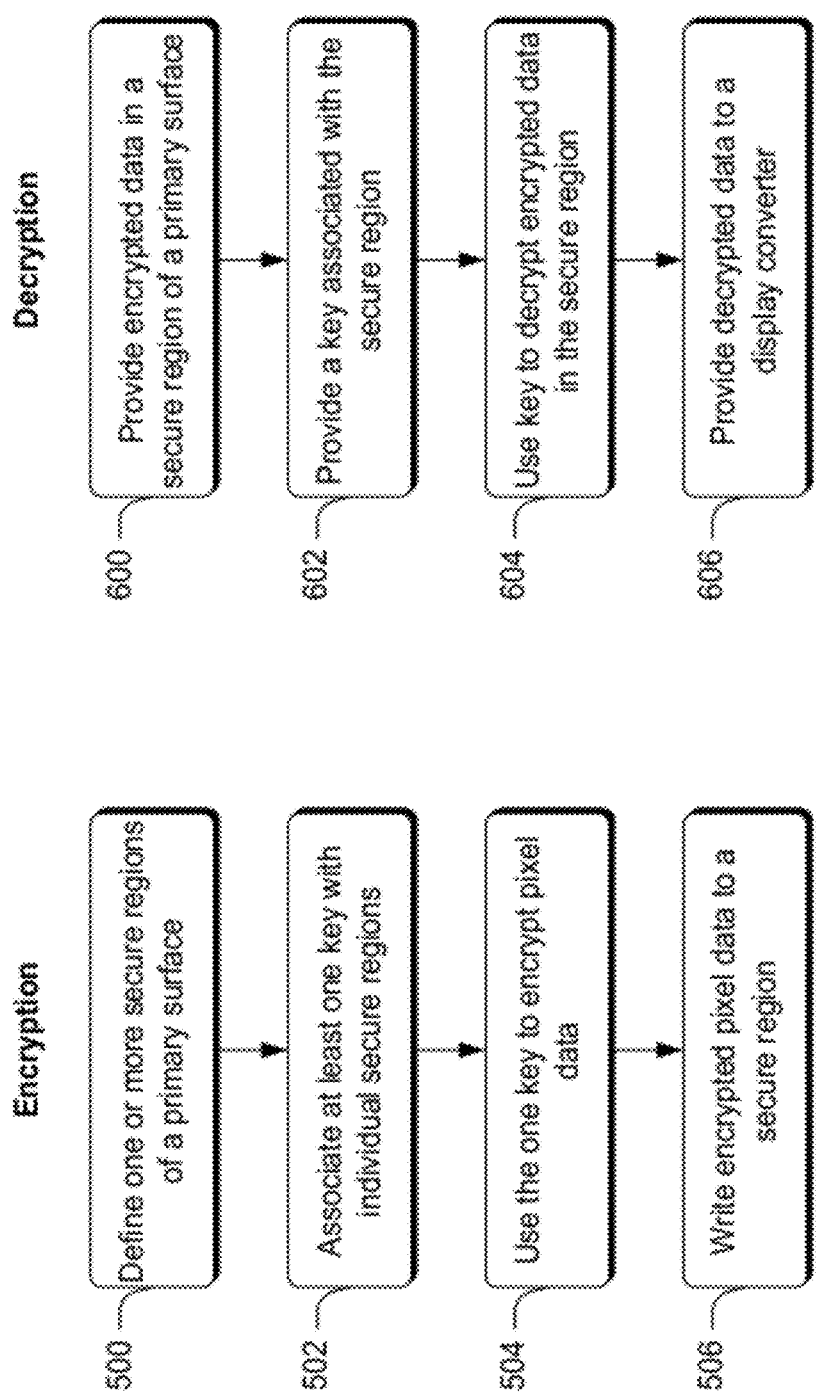

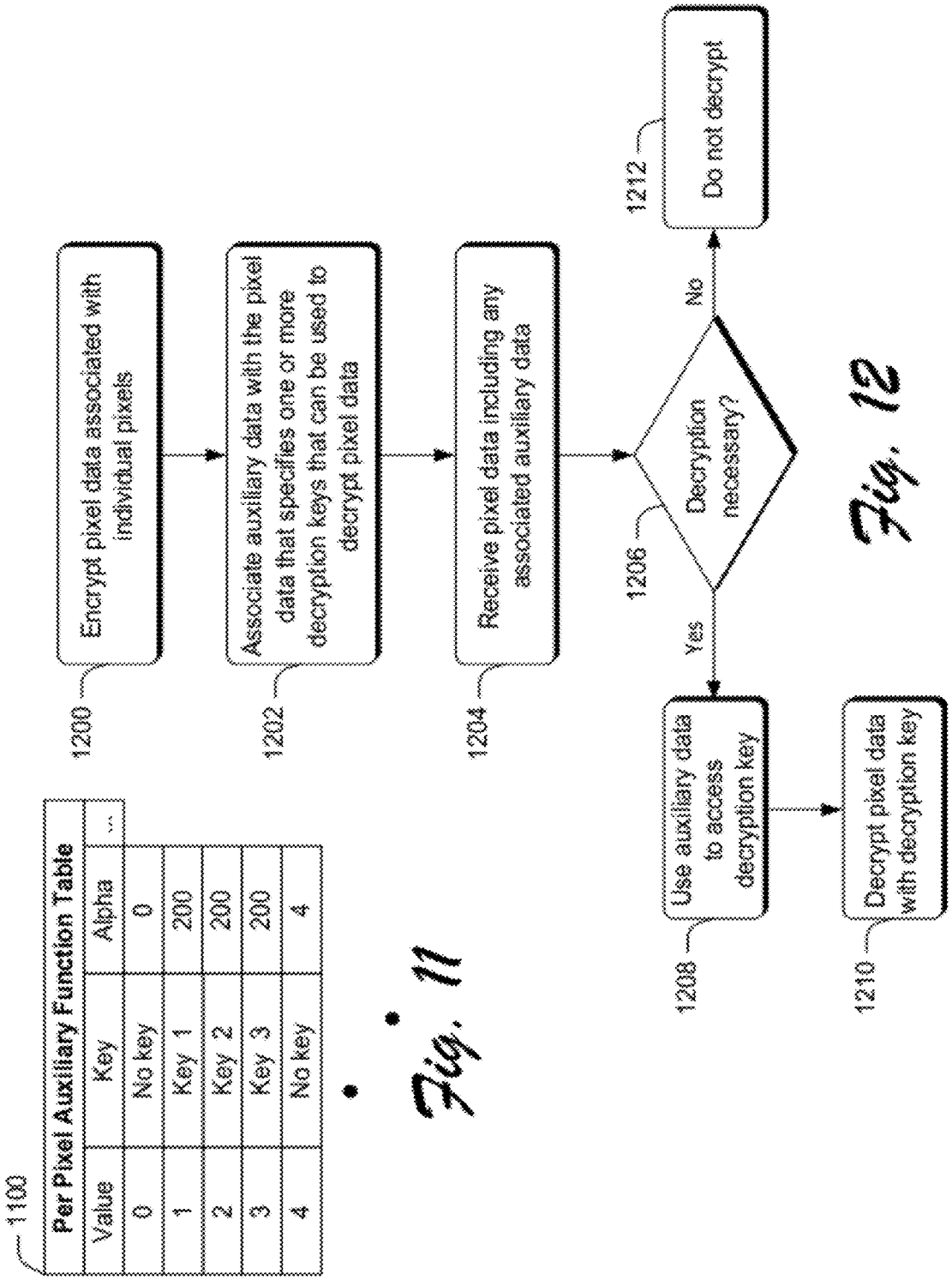

| Secondary Pixel Table |||| 
|---|---|---|---|
| Pixel | Process ID | Expected Hash | Current Hash |
| 1 | x | ******* | ******* |
| 2 | x | ******* | ******* |
| 3 | x | ******* | ******* |
| ... | | | |

AUXILIARY FUNCTIONALITY FOR PIXEL DATA

RELATED APPLICATION

This application is a continuation of and claims priority to U.S. application Ser. No. 10/178,804, entitled "Systems and Methods for Securing Video Card Output," the disclosure of which is incorporated in its entirety by reference herein.

BACKGROUND

Typically, content that resides on a computer can come under attack by individuals who wish to steal or modify the content. As an example, consider the case of a content author, such as a movie studio or a user publishing content on the web. Typically these individuals will publish video content that has restrictions on how users can view it. This content can typically be viewed or rendered on a computer such as a personal computer. A great deal of time, effort and money is spent each year by unscrupulous individuals and organizations trying to steal or otherwise inappropriately obtain such video content. Additionally, consider the case of eCommerce software that enables individuals to transact, for example, banking transactions. The data that is displayed on a display monitor for the user to review and manipulate can come under attack by rogue software applications executing on the user's computer. That is, rogue programs or devices can and often do try to inappropriately obtain content once it has been received on a computer, such as a personal computer.

One solution for content security can include various software-based digital rights management (DRM) solutions. The problem here is that no matter how good the software-based, tamper-resistant, "hard-to-observe" DRM system that does the software rendering is—ultimately, the bits get written out to a video card where they can be "seen" or even copied by other software. This presents a sphere of vulnerability. Thus, the video card that processes the video content can be the subject of software attacks.

FIG. 1 shows an exemplary video (or graphics) card 100 that includes a bus connector 102 that inserts into a port on a typical computer. Video card 100 also includes a monitor connector 104 (e.g. a 15-pin plug) that receives a cable that connects to a monitor. Video card 100 can include a digital video-out socket 106 that can be used for sending video images to LCD and flat panel monitors and the like.

The modern video card consists of four main components: the graphics processor unit (GPU) 108, the video memory 110, the random access memory digital-to-analog converter (RAMDAC) 112, and the driver software which can be included in the Video BIOS 114.

GPU 108 is a dedicated graphics processing chip that controls all aspects of resolution, color depth, and all elements associated with rendering images on the monitor screen. The computer's central processing unit or CPU (not shown) sends a set of drawing instructions and data, which are interpreted by the graphics card's proprietary driver and executed by the card's GPU 108. GPU 108 performs such operations as bitmap transfers and painting, window resizing and repositioning, line drawing, font scaling and polygon drawing. The GPU 108 is designed to handle these tasks in hardware at far greater speeds than the software running on the system's CPU. The GPU then writes the frame data to the frame buffer (or on-board video memory 110). The GPU greatly reduces the workload of the system's CPU.

The memory that holds the video image is also referred to as the frame buffer and is usually implemented on the video card itself. In this example, the frame buffer is implemented on the video card in the form of memory 110. Early systems implemented video memory in standard DRAM. However, this requires continual refreshing of the data to prevent it from being lost and cannot be modified during this refresh process. The consequence, particularly at the very fast clock speeds demanded by modern graphics cards, is that performance is badly degraded.

An advantage of implementing video memory on the video card itself is that it can be customized for its specific task and, indeed, this has resulted in a proliferation of new memory technologies:

Video RAM (VRAM): a special type of dual-ported DRAM, which can be written to and read from at the same time. It also requires far less frequent refreshing than ordinary DRAM and consequently performs much better;

Windows RAM (WRAM): as used by the Matrox Millennium card, is also dual-ported and can run slightly faster than conventional VRAM;

EDO DRAM: which provides a higher bandwidth than DRAM, can be clocked higher than normal DRAM and manages the read/write cycles more efficiently;

SDRAM: Similar to EDO RAM except the memory and graphics chips run on a common clock used to latch data, allowing SDRAM to run faster than regular EDO RAM;

SGRAM: Same as SDRAM but also supports block writes and write-per-bit, which yield better performance on graphics chips that support these enhanced features; and DRDRAM: Direct RDRAM is a totally new, general-purpose memory architecture which promises a 20-fold performance improvement over conventional DRAM.

Some designs integrate the graphics circuitry into the motherboard itself and use a portion of the system's RAM for the frame buffer. This is called "unified memory architecture" and is used for reasons of cost reduction only and can lead to inferior graphics performance.

The information in the video memory frame buffer is an image of what appears on the screen, stored as a digital bitmap. But while the video memory contains digital information its output medium—the monitor—may use analog signals. The analog signals require more than just an "on" or "off" signal, as it is used to determine where, when and with what intensity the electron guns should be fired as they scan across and down the front of the monitor. This is where RAMDAC 112 comes into play as described below. Some RAMDACs also support digital video interface (DVI) outputs for digital displays such as LCD monitors. In such configurations, the RAMDAC converts the internal digital representation into a form understandable by the digital display.

The RAMDAC plays the role of a "display converter" since it converts the internal digital data into a form that is understood by the display.

Even though the total amount of video memory installed on the video card may not be needed for a particular resolution, the extra memory is often used for caching information for the GPU 108. For example, the caching of commonly used graphical items—such as text fonts and icons or images—avoids the need for the graphics subsystem to load these each time a new letter is written or an icon is moved and thereby improves performance. Cached images can be used to queue up sequences of images to be presented by the GPU, thereby freeing up the CPU to perform other tasks.

Many times per second, RAMDAC 112 reads the contents of the video memory, converts it into a signal, and sends it over the video cable to the monitor. For analog displays, there is typically one Digital-to-Analog Converter (DAC) for each of the three primary colors the CRT uses to create a complete spectrum of colors. For digital displays, the RAMDAC outputs a single RGB data stream to be interpreted and displayed by the output device. The intended result is the right mix needed to create the color of a single pixel. The rate at which RAMDAC 112 can convert the information, and the design of GPU 108 itself, dictates the range of refresh rates that the graphics card can support. The RAMDAC 112 also dictates the number of colors available in a given resolution, depending on its internal architecture.

The bus connector 102 can support one or more busses that are used to connect with the video card. For example, an Accelerated Graphics Port (AGP) bus can enable the video card to directly access system memory. Direct memory access helps to make the peak bandwidth many times higher than the Peripheral Component Interconnect (PCI) bus. This can allow the system's CPU to do other tasks while the GPU on the video card accesses system memory.

During operation, the data contained in the on-board video memory can be provided into the computer's system memory and can be managed as if it were part of the system's memory. This includes such things as virtual memory management techniques that the computer's memory manager employs. Further, when the data contained in the system's memory is needed for a graphics operation on the video card, the data can be sent over a bus (such as a PCI or AGP bus) to the video card and stored in the on-board video memory 110. There, the data can be accessed and manipulated by GPU 108 as described above.

Embodiments arose out of concerns associated with providing methods and systems for protecting data. In particular, embodiments arose out of concerns associated with providing methods and systems that are resistant to software attacks, particularly those attacks that are waged by a rogue application executing on a user's machine.

SUMMARY

The various methods and systems described herein are directed to supplying a secure channel for software executing on a host computer. The methods and systems address and provide solutions for an attack model in which rogue software executing on the host computer attempts to inappropriately obtain or otherwise manipulate data. Some embodiments can provide pixel data that can be kept confidential (in that untrusted software applications cannot read the data off of the display screen). In addition, other embodiments can preserve the integrity of the pixel data by detecting whether the pixel data has been inappropriately manipulated.

Various embodiments are based on a decryption engine that is located on a video card very late in the video processing chain such that programmatic access to decrypted pixel data is denied.

BRIEF DESCRIPTION OF DRAWINGS

FIG. 5 is a flow diagram that describes steps in a method in accordance with one embodiment.

FIG. 6 is a flow diagram that describes steps in a method in accordance with one embodiment.

FIG. 11 is a diagram that shows an exemplary per-pixel key table in accordance with one embodiment.

FIG. 12 is a flow diagram that describes steps in a method in accordance with one embodiment.

FIG. 13 is a diagram that shows an exemplary table in accordance with one embodiment.

DETAILED DESCRIPTION

Exemplary Computer System

Figure 2:
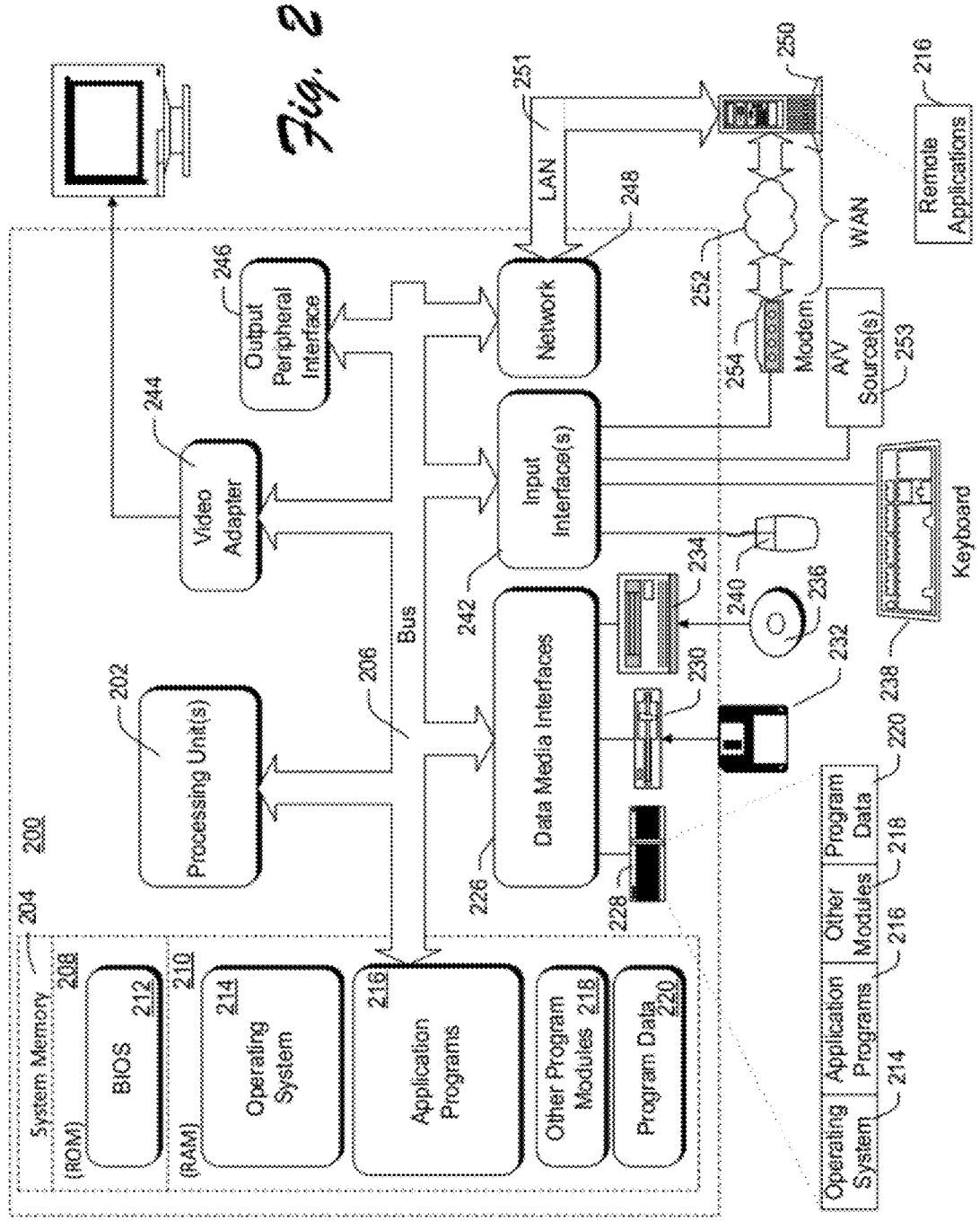
FIG. 2 is a block diagram of an exemplary computer system that can employ video cards in accordance with the described embodiment.

FIG. 2 illustrates an example of a suitable computing environment 200 on which the system and related methods described below can be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The various described embodiments can be operational with numerous other general purpose or special purpose computing system environments or configurations. Examples of well-known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2, computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include an audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter or video/graphics card 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2, computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Overview

The various methods and systems described herein are directed to supplying a secure channel for software executing on a host computer. The methods and systems address and provide solutions for an attack model in which rogue software executing on the host computer attempts to inappropriately obtain or otherwise manipulate data.

The various embodiments can provide a secure execution environment in which data can be securely rendered on a display screen for a user to interact with. The described embodiments can embody, among other characteristics, one or both of the following characteristics.

The first characteristic is that the data, e.g. pixel data that resides on the video card, can be kept confidential. This means that untrusted software applications (or rogue applications) cannot read the data off of the display screen or from video memory. The confidentiality aspect is useful in the digital workplace arena because if one is rendering video or pixel data, it is desirable to be able to send video data to the video card in a way such that a "cracking tool" running on the computer cannot read the data. For example, consider that a user is working in a secure email program that enables them to receive data in encrypted form. Various embodiments can enable the data to be rendered onto the display screen without the risk of a rogue application being able to access the data.

The second characteristic is that of integrity. By this is meant that, fundamentally, one does not want untrusted software (or rogue software) to be able to manipulate the data that is displayed on portions of a display. Consider, for example, an eCommerce setting in which a user arranges, via software executing on their computer, to pay a certain entity $10. The user might simply type in the dollar amount in a window displayed on their display screen. It is possible, however, for a rogue application to change the "$1000" to "$10". Understandably, this is undesirable: the user has authorized a payment of a larger amount than that they intended.

Additionally, if some untrusted software does inappropriately manipulate the data in some way, it would be desirable to be able to tell that this has occurred. Accordingly, some of the embodiments described below provide a means by which data manipulation can be detected.

Exemplary Embodiments

The embodiments described below are directed to providing secure video output—that is, video output that is not susceptible to software attack. Various embodiments can provide window-based protections that can be selectively applied to regions (i.e. windows) on the user's display screen, rather than the whole screen area itself—although whole screen protection is not excluded. The secure video output cannot typically be read by untrusted software. This behavior provides protection for content such as premium content (e.g. videos, books), as well as a wide variety of general e-Commerce and security applications.

In addition, various embodiments can provide so-called secure dialogs that are not obscureable (either partially or completely) by untrusted dialogs. This behavior is most useful in the context of general e-Commerce transactions.

The embodiments described below are encryption-based solutions that provide secure video output. Advantages of the various embodiments are that the embodiments are typically easy to implement and have virtually no impact on existing software architectures.

Some of the embodiments about to be described are based on a decryption engine that is located on the video card very late in the video processing chain. In the examples described in this document, many aspects of the embodiments are implemented in hardware—other aspects can be implemented in firmware and software as well.

Embodiments enable various data that is to be displayed on a user's display screen to be encrypted. Accordingly, attacks that are directed to stealing the data will result only in encrypted data being stolen. Encryption techniques can be utilized such that any stolen encrypted data is mathematically infeasible to decrypt. Additionally, decryption of the encrypted data takes place at a point in the processing chain such that there is no programmatic access to the decrypted bits that are to be displayed. That is, there is no software access to the decrypted bits so that rogue software executing on the user's computer cannot access the decrypted bits.

In one embodiment, a decryptor is located on the video card and is placed intermediate the GPU and the display convertor (e.g. the RAMDAC). The decryptor is can be implemented in hardware and can process the encrypted data in "real time" as the video card is rastering the frame-buffer to the display converter.

Exemplary Architecture

Figure 3:
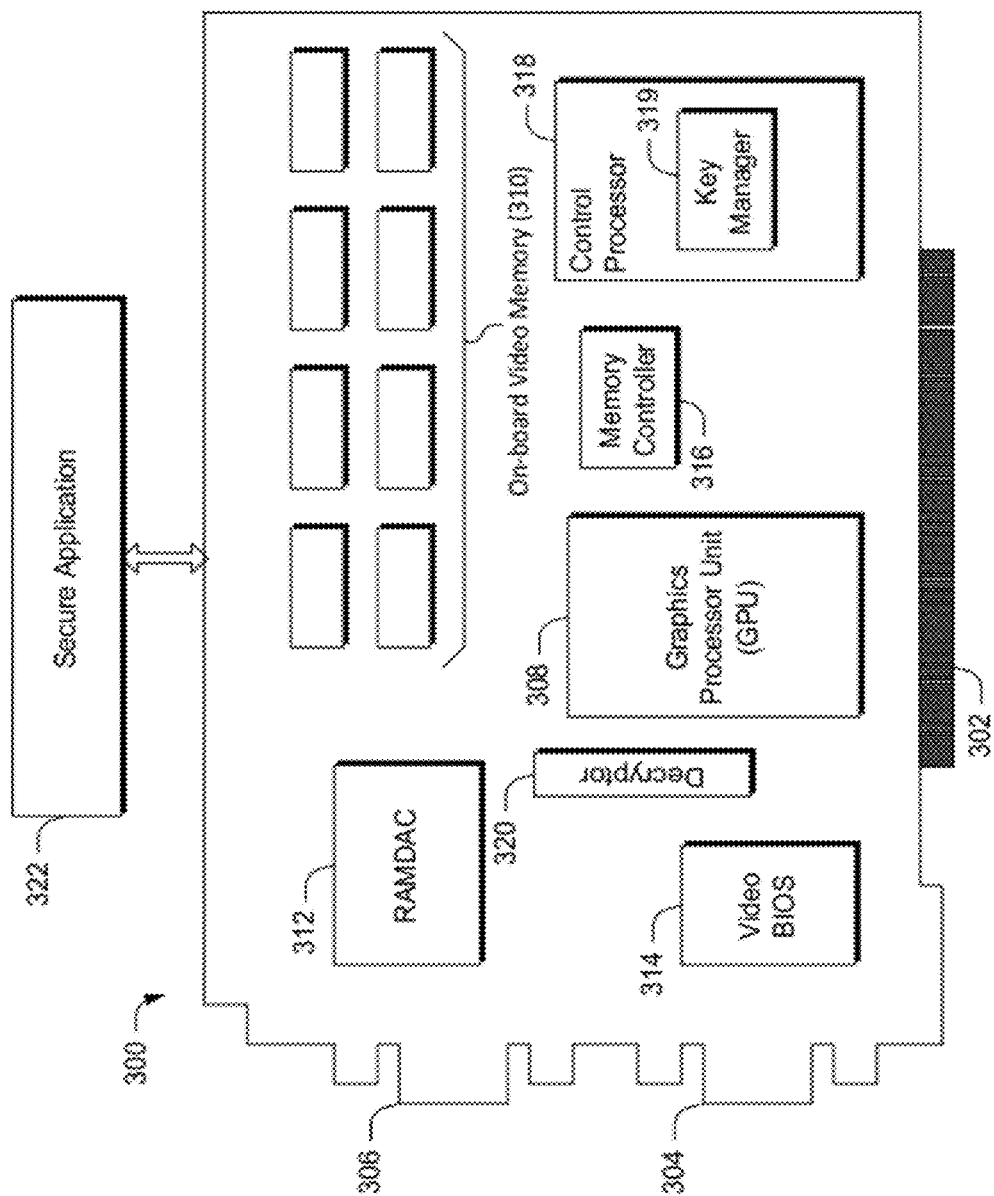
FIG. 3 is a block diagram that shows various components of an exemplary video or graphics card in accordance with one embodiment.

FIG. 3 shows an exemplary video (or graphics) card 300 in accordance with one embodiment. Card 300 includes a bus connector 302 that plugs into a port on a typical computer. Video card 300 also includes a monitor connector 304 (e.g. a 15-pin plug) that receives a cable that connects to a monitor. Video card 300 can, but need not, include a digital video-out (e.g. DVI) socket 306 that can be used for sending video images to digital displays and the like.

Figure 1:
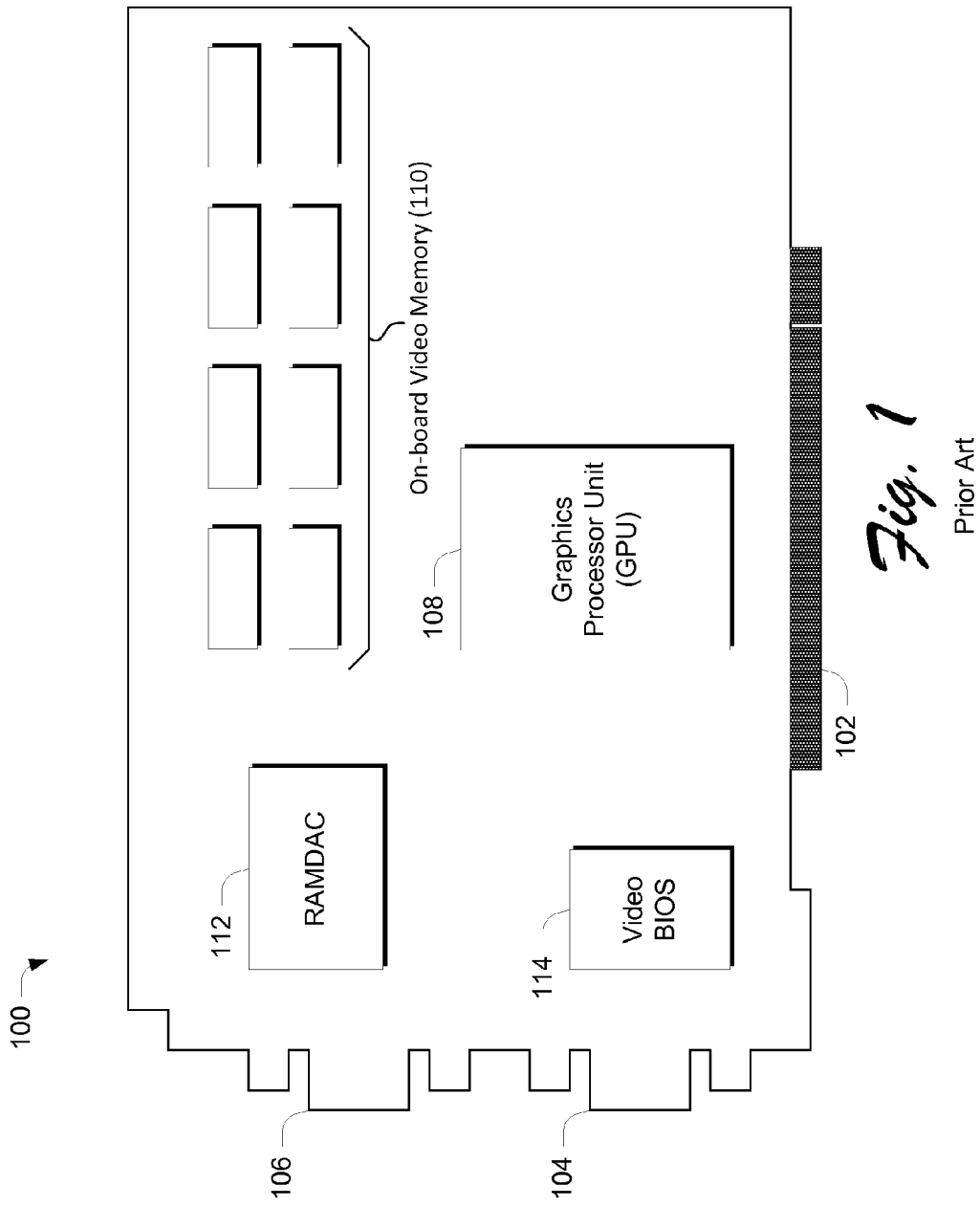
FIG. 1 is a block diagram that shows various components of an exemplary video or graphics card that is intended for use in a computer system.

Like the video card of FIG. 1, video card 300 comprises a graphics processor unit (GPU) 308, video memory 310, display convertor or random access memory digital-to-analog converter (RAMDAC) 312, and driver software which can be included in the Video BIOS 314.

GPU 308 is a dedicated graphics processing chip that controls all aspects of resolution, color depth, and all elements associated with rendering images on the monitor screen. The memory controller (sometimes integrated into the GPU) manages the memory on the video card. The computer's central processing unit or CPU (not shown) sends a set of drawing instructions and data, which are interpreted by the graphics card's proprietary driver and executed by the card's GPU 508. GPU 308 performs such operations as bitmap transfers and painting, window resizing and repositioning, line drawing, font scaling and polygon drawing. The GPU can then write the frame data to the frame buffer (or on-board video memory 310).

The information in the video memory frame buffer is an image of what appears on the screen, stored as a digital bitmap. RAMDAC 312 is utilized to convert the digital bitmap into a form that can be used for rendering on the monitor, as described above.

In addition to these components, in this embodiment, video card 300 comprises a memory controller 316 and a control processor 318 that can include a key manager 319. The video card also includes a decryptor 320. These components can be implemented in any suitable hardware, software, firmware or combination thereof.

Memory controller 316 receives data on the video card and manages the data in the video memory 310. The memory controller can also be responsible for managing data transfers between the video card and system memory.

A control processor 318 is provided and can include a key manager 319. The control processor can be responsible for organizing cryptographic functions that take place on the video card. For example, the control processor 318 can communicate, via a dedicated bus or secure channel, with decryptor 320 to ensure that the decryptor has the decryption capabilities that it needs to properly decrypt pixel data that has been encrypted for security reasons. The control processor 318, through the key manager 319, can manage keys that are associated with encrypting and decrypting pertinent pixel data. In some embodiments the control processor can be implemented as a separate integrated circuit chip on the video card.

Decryptor 320 is configured or configurable to decrypt pertinent pixel data. For example, as described in more detail below, data that is to be protected can be encrypted and written to a secure region comprising part of the so-called "primary surface" or desk top surface of the video card's memory that contains data that is used by the RAMDAC 512 for rendering an image on the monitor. The encrypted image may be copied to a temporary location in the video memory before being copied to the primary surface. The control processor 318 can set the encryption keys that are to be used to encrypt data and can provide decryption keys to the decryptor 320 for use in decrypting encrypted pixel data. Once the data has been decrypted, the data can be passed through to the RAMDAC for further processing.

It should be appreciated and understood that while the decryptor is illustrated as a separate component, the RAMDAC can be provided with suitable decryption functionalities so as to effectively operate as a decryptor.

In operation, a secure or trusted software application 322 can set up a shared key between the decryptor 320 and the software application. The software application can then use the key to generate encrypted pixel data that can be stored in memory (either video memory 310 or system memory).

There are typically a couple of different ways that the pixel data can get written into the protected regions of the primary surface or frame buffer. First, the pixel data can be written directly to the frame buffer via a "move" operation that the memory controller arranges. Second, an application (such as secure application 322) can assemble the pixel data that is to be protected in system memory where it is encrypted. Encrypted data in the system memory will eventually be copied to the primary surface for decryption and rendering.

The control processor can then ensure that the decryptor 320 knows which key to use to decrypt the pixel data before the data is sent to the RAMDAC 312 (or before it is rendered on the monitor).

Thus, in this example, there is a mechanism by which one or more keys can be shared between trusted entities. Data can be encrypted on the video card and decrypted at a point in the data processing chain so that unencrypted data that is to be rendered to a display monitor is not susceptible to a software attack. Untrusted or rogue entities that try to read the encrypted data out of the protected region(s) of the primary surface will read only encrypted data which is effectively useless to them. Additionally, this holds true when VRAM memory is mapped into system memory via virtual memory management techniques. Thus, whether the data that is supposed to be in the protected region(s) of the primary surface is either on the video card or mapped into the system's memory, it is encrypted and thus protected.

Secure Window(s)

Figure 4:
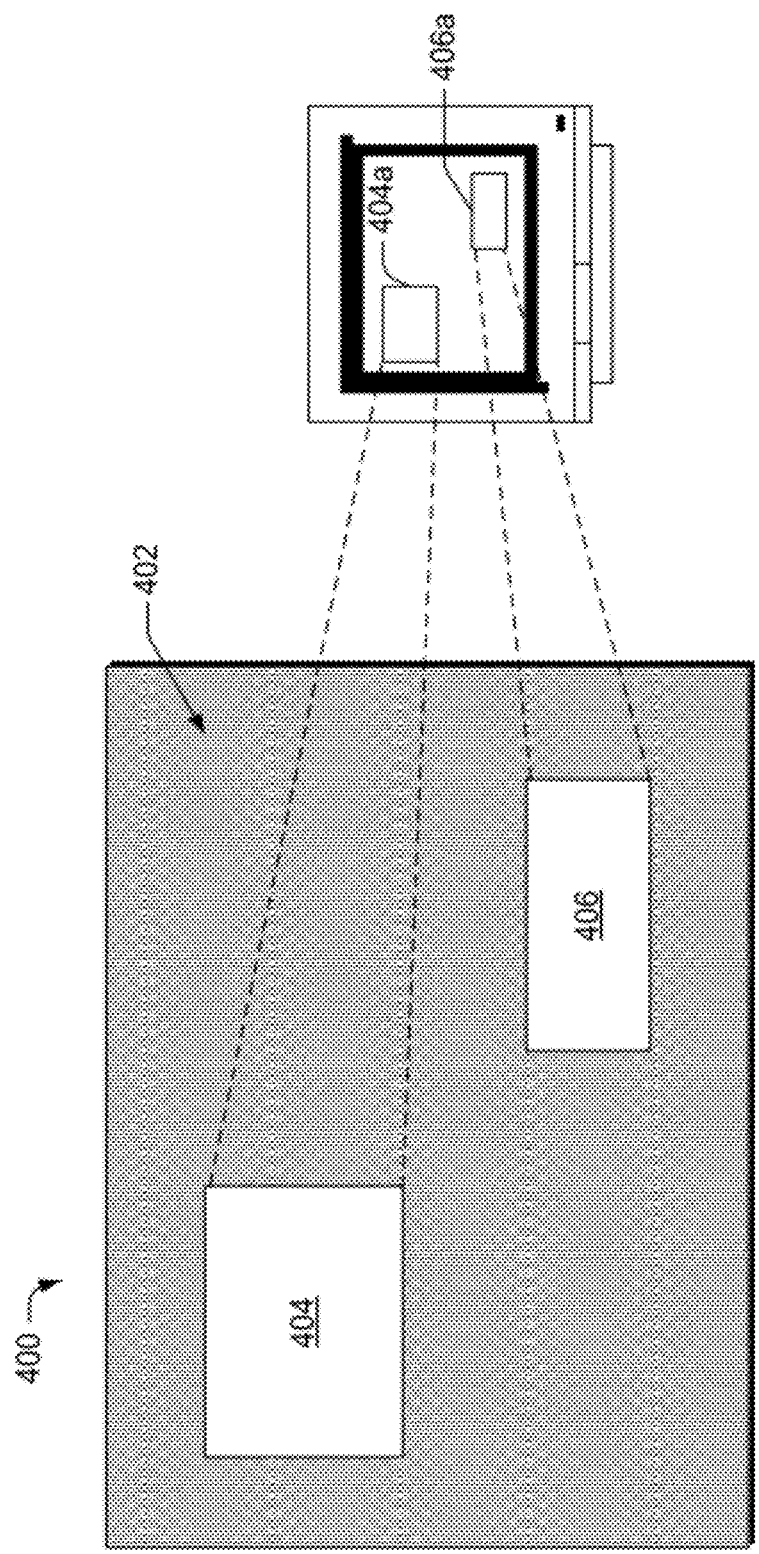
FIG. 4 is a block diagram that shows an exemplary primary surface having secure and non-secure regions.

In one embodiment, one or more secure windows are provided and can be used to display confidential data on a user's display screen. The secure windows on a user's display screen are associated with and correspond to secure regions of the primary surface in the video card's memory (or system memory if virtual memory management techniques are used). As an example, consider FIG. 4.

There, a diagrammatic representation of the video card's primary surface is shown generally at 400. Primary surface 400 comprises a region 402 (shaded) that contains unencrypted data, and one or more regions that contain encrypted data. In this particular example, two exemplary secure regions 404, 406 can contain encrypted data. Each secure region's corresponding secure window is shown at 404a, 406a respectively.

In this embodiment, decryptor 320 (FIG. 3) is configured to pass through all of the pixel data in region 402 without modifying (i.e. decrypting) it. That is, since the data residing in region 402 is not encrypted, there is no need for the decryptor 320 to decrypt the data. However, the decryptor does decrypt the encrypted data that resides in regions 404 and 406.

The pixel data within regions 404, 406 can be decrypted by the decryptor using a key associated with the secure region. In some embodiments, a single key can be associated with all of the secure regions. In other embodiments, each secure region can have its own associated key. One reason for having separate keys for each of the secure regions is that some secure regions may not be associated with certain applications that can access other secure regions. For example, assume that a secure email application is associated with one secure region in which encrypted email is to reside. Assume also that an eCommerce application is associated with a different secure region. There is really no reason for the email application to have access to the secure region associated with the eCommerce application. Yet, if there is only one key for all of the secure regions, then presumably all applications that can access one secure region can access all other secure regions. Accordingly, by providing a different key for each of the secure regions, access to each secure region is limited to only those applications that can have access.

Alternatively, in another embodiment, a central entity (a "mixer" or "compositor") could take several regions and transcript them to a common key to be decrypted by the display hardware. Each application would have to trust the compositor entity.

FIG. 5 is a flow diagram that describes steps in an encryption method in accordance with one embodiment. The method can be implemented in any suitable hardware, software, firmware or combination thereof. In the present example, the method can be implemented, at least in part, by a suitably configured video card—an example of which is given above.

Step 500 defines one or more secure regions of a primary surface. The regions can comprise any suitable shape and size. In the example above, the secure regions happen to be rectangular in shape. The regions can be smaller in dimension than that necessary to occupy the entire display screen when rendered to the display screen. Step 502 associates at least one key with individual secure regions of the primary surface. The key or keys can be used to encrypt and/or decrypt pixel data that is to reside in the secure region. Step 504 uses the key or keys to encrypt pixel data. This step can be implemented by trusted system software, firmware and/or hardware. For example, a secure application such as application 322 can cause pixel data to be encrypted. Step 506 writes or otherwise moves the encrypted pixel data to a secure region of the primary surface. Note that once the pixel data is encrypted, the underlying decrypted pixel data is protected from theft.

FIG. 6 is a flow diagram that describes steps in a decryption method in accordance with one embodiment. The method can be implemented in any suitable hardware, software, firmware or combination thereof. In the present example, the method can be implemented, at least in part, by a suitably configured video card—an example of which is given above.

Step 600 provides encrypted data in a secure region of the video card's primary surface. Step 602 provides a key associated with the secure region. This step can be implemented by control processor 318 (FIG. 3). For example, the control processor can provide one or more keys to the decryptor for use in decrypting the encrypted pixel data. Step 604 uses the key to decrypt the encrypted data in the secure region of the primary surface. This step can be implemented by decryptor 320 (FIG. 3). Note that the point in the pixel data-processing chain where decryption takes place is programmatically inaccessible. Thus, the decrypted pixel data is protected from software attack. Step 606 then provides the decrypted data to a display converter for further processing which includes rendering the pixel data onto the user's display screen.

Implementation Example

In one implementation, encryption and decryption can take place using a public-key-based engine. A control protocol can allow software, such as a security application, to send commands in encrypted form to the control processor 318 (FIG. 3), and receive cryptographic acknowledgements to ensure that the commands have been executed.

Any suitable command set can be used. As an example, the following commands (or ones similar to them) can be used:

GetPK( ) Return the device public encryption key

SetSec( ) Set a secure region shape and encryption key for that region shape.

ClearSec( ) Clear the encryption for a region

In some embodiments, the decryptor 320 can infer the geometry of the secure region so that it can decrypt encrypted pixel data within the region. In yet other embodiments, the decryptor can be informed of the geometry. This can be useful when, for example, a secure window is dragged and dropped to a different location on the user's display screen. For example, the GPU 308 can embody a geometry processor (not specifically illustrated) which maintains a list of the secure regions of the primary surface and various security data that are associated with those regions. The security data can include the x- and y-coordinates of the regions, width and height dimensions of the region and the key associated with the particular region. The decryptor 320 can be notified of this security data so that when it begins to process pixel data, it knows whether a particular pixel belongs to one of these regions and needs to be decrypted, or whether the particular pixel data is to be passed through to the RAMDAC. If a secure window is moved, the geometry processor can notify the decryptor of the new coordinates of the security window.

In one example architecture the public key and control functionality can be modularized into a discrete external device with on-board flash memory (similar to a 'smartcard'). Conversely, the decryptor 320 can be incorporated into the GPU silicon (i.e. integrated with the GPU). The control processor 318 can then pass decryption keys directly to the GPU. As a further preventative measure to avoid software attacks, a dedicated bus can be provided between the control processor 318 and the GPU 308.

In operation, the control processor 318 can be authenticated by secure software/hardware and can receive encrypted commands like "set the encryption key for this secure region to be x." The control processor can then return a cryptographic response to ensure that the command was properly executed.

The encryption key can now be used to render video data to the secure region. In this example, it may be possible for adversarial code to read this encrypted data. However, any data that is read by such code is encrypted and effectively useless to the adversarial code. It may be possible, in some implementations, for adversarial code to modify the encrypted data. Encrypted data that is modified will, however, be decrypted into data which, when rendered on a display screen, will appear logically out of context. For example, such data can appear, when rendered onto a display screen as random noise/grey output. This sort of attack will most assuredly be noticed by the user.

In addition, use of authentication information can ensure that if pixel data is modified by adversarial code, the user will be apprised of it. As an example, consider the following. The secure data format can be required to comprise a certain number of bits per pixel, e.g. 24 bits/pixel. Of the 24 bits/pixel, 8 bits can always be required to have a value of zero. The decryptor can then be configured to make non-compliant pixels flash purple, and can notify the control processor that there has been an attack.

Further, other techniques can be used to ensure that if pixel data is inappropriately modified, such modification can be detected. As an example, consider the following. A hash can be computed for the pixel data associated with each pixel that is to be rendered. As the pixel data is processed by the display converter (e.g. the RAMDAC 312), the display converter can then compute a hash of the pixel data and compare the computed hash with the previously computed hash for the pixel data. If there has been an inappropriate data modification, then the hash comparisons will indicate that such has occurred.

Exemplary Encryption Techniques

Various encryption techniques can be utilized to ensure that pixel data that resides in secure regions of the primary surface is encrypted and then properly decrypted later by the decryptor. Two exemplary encryption techniques are described below—although other techniques can be used without departing from the spirit and scope of the claimed subject matter.

A first encryption technique that can be used is a stream cipher. Stream ciphers are typically very fast in software and very easy to implement in hardware. A stream cipher is a type of symmetric encryption algorithm that typically operates on smaller units of plaintext, usually bits. A stream cipher generates what is called a keystream (a sequence of bits used as a key). Encryption is accomplished by combining the keystream with the plaintext or bits, usually with the bitwise XOR operation. The generation of the keystream can be independent of the plaintext and ciphertext, yielding what is termed a synchronous stream cipher, or it can depend on the data and its encryption, in which case the stream cipher is said to be self-synchronizing. Most stream cipher designs are for synchronous stream ciphers. The same stream cipher can then be used to decrypt data that has been encrypted.

The stream cipher can be run over the entire primary surface in a manner that only decrypts data in the secure regions of the primary surface. This, however, is not the best choice as the stream cipher need not be run over the entire primary surface—but only those secure regions. Accordingly, the range over which the stream cipher is run can be restricted so that the range is defined only with the bounds of the secure region or regions. An example way of implementing a restricted range stream cipher is to define, for each refresh of the display, a starting location for the stream cipher—such as the top left pixel of a secure region. The stream cipher can then be run within the secure region until the bottom right pixel of the secure region is processed.

Figure 7:
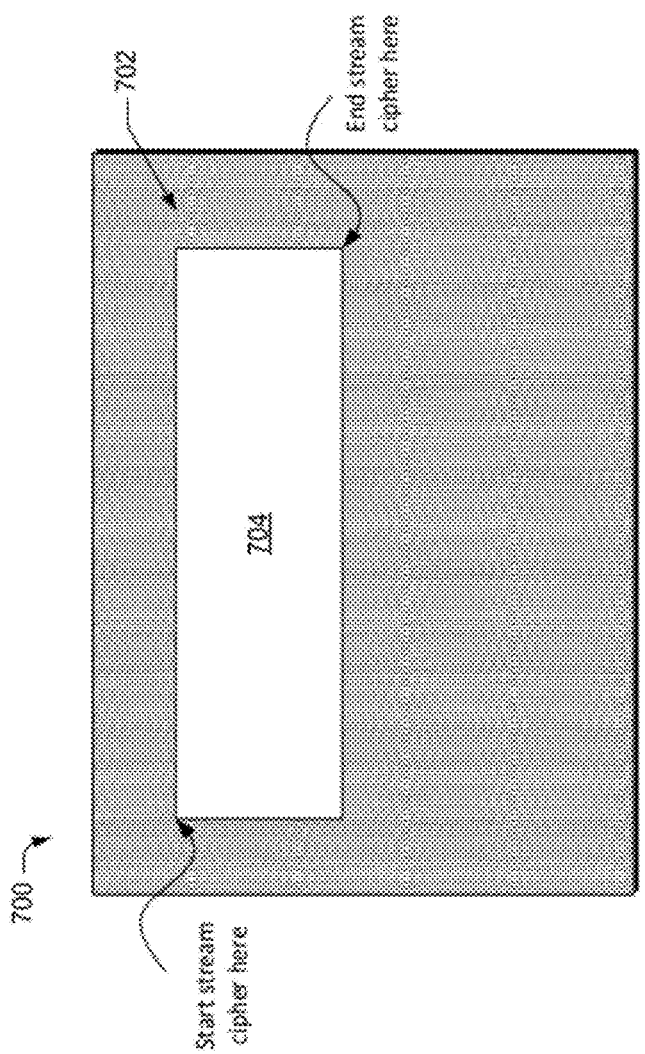
FIG. 7 is a block diagram that shows an exemplary primary surface having a secure region and a non-secure region.

As an example, consider FIG. 7. There, a primary surface 700 comprises a region 702 in which unencrypted pixel data is to reside and a secure region 704 in which encrypted pixel data (encrypted with a stream cipher) is to reside. With an appropriately range-restricted stream cipher, the stream cipher can be run starting at the location indicated at the top left pixel, and ending at the location indicated at the bottom right pixel. When the encrypted data is to be decrypted, the decryptor (such as decryptor 320), can be notified of the coordinates of the starting and stopping locations of the stream cipher. One of the nice characteristics of this implementation is that if the secure window associated with one of the secure regions is dragged and dropped to another location (which may invoke untrusted software to move the window around), the encryption operation can continue to take place at the new location. To implement this, the encrypting entity need only be notified of the new coordinates of the secure window (and hence the secure region on the primary surface) so that the encrypting entity can perform its encryption processing at the new location. Similarly, the decryptor 320 can also be notified of the location so that it can run the stream cipher at the proper location for decrypting the encrypted pixel data.

The encryptor can allow the stream cipher to continue across several frames, thereby making differential attacks more difficult. The key for the stream cipher can be changed after each group of frames. To reduce the number of keys, a fixed array of keys can be negotiated prior to being used. The encryptor can cycle through the array of keys choosing a different key for each group of frames.

A second encryption technique that can be used is a block cipher. A block cipher is a type of symmetric-key encryption algorithm that transforms a fixed-length block of plaintext data or bits (unencrypted text or bits) into a block of ciphertext (encrypted text or bits) of the same length. This transformation takes place under the action of a user-provided secret key.

Decryption is performed by applying the reverse transformation to the ciphertext block using the same secret key. The fixed length is called the block size, and for many block ciphers, the block size is 64 bits. In the coming years the block size will increase to 128 bits as processors become more sophisticated.

Authentication

In some embodiments, authentication techniques can be utilized to ensure the integrity and identity of the video card. Important goals for a secure software application that is to interact with a video card are that the application be able to reliably authenticate that (1) the application is really communicating with a video card, and not a piece of software that is emulating a video card, and (2) that the application is really communicating to a video card that obeys or conforms to pre-defined rules associated with the rendering of the pixel data.

Authentication techniques can be implemented in a couple of different ways—e.g. through cryptographic certification and other communication protocols.

Cryptographic certification pertains to building a video card that is furnished with a certified key and a digital certificate. Using its key and certificate, the video card can engage in a cryptographic conversation with secure software applications. For example, the digital certificate can be used to authenticate the video card, and the certified key can be used to encrypt communications that take place with the secure application. To implement cryptographic certification, each video card can have a separate security IC chip that is manufactured by a trusted entity. Cryptographic certification techniques are well known and understood by those of skill in the art. Accordingly, and for the sake of brevity, cryptographic certification is not described in additional detail here.

Another means of authentication can be associated with a secure protocol that is established between secure applications and the video card. Secure protocols can allow the application to have some assurances that it is communicating with a valid video card. For example, the trusted application can issue a challenge to the video card to identify itself and the card can respond with a response that it is a trusted video card. Various known secure protocol techniques can be utilized.

Several advantages are provided by the embodiments described above. First, techniques are provided that can ensure that data (both on and off a video card) is protected from software attacks. Protection is provided in the form of encryption techniques that can be utilized to encrypt data residing on the primary surface of the video card. Decryption can then take place at a point in the data processing pipeline at which there is no software access. Thus, any read attacks by rogue software will yield encrypted and essentially useless data. Thus, pixel data can be kept confidential. Further, various techniques can enable the integrity of the data to be preserved. That is, in the event of a data modification attack, various detection methods can be employed to ensure that the appropriate notifications are generated (both application notifications and user notifications). Further, advantages are achieved by being able to define secure regions of the primary surface that are identified by a particular geometry.

Per-Pixel Auxiliary Functionality

In some embodiments, functionality can be provided at the granularity of individual pixels. For example, the secure regions of the primary surface do not typically overlap. In some instances, however, users may desire to move windows around on their display so that they overlap. Overlapping regions can inject additional design considerations into the design of the components that perform the encrypting and decrypting functions.

Figure 8:
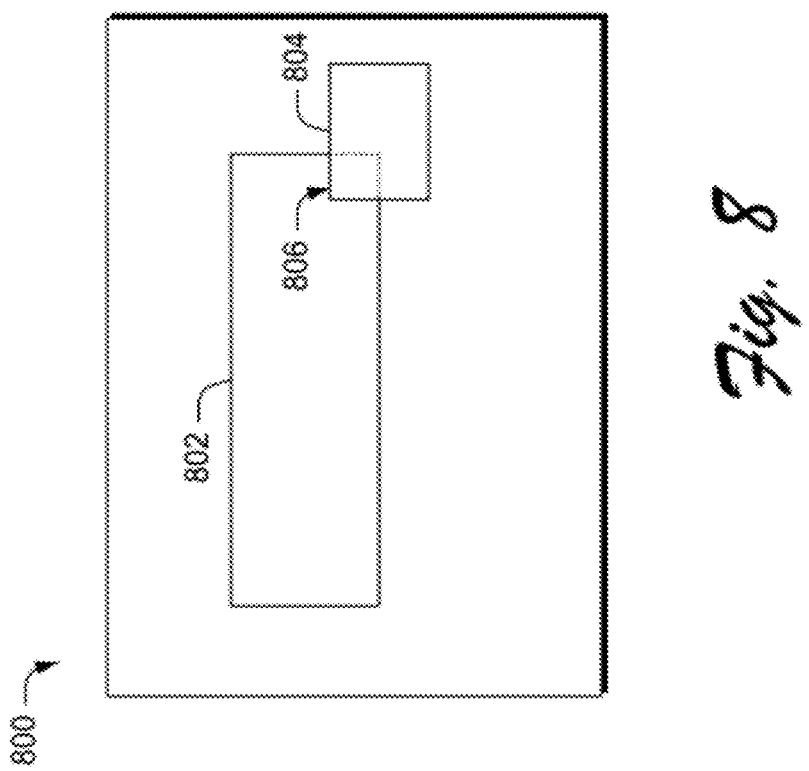
FIG. 8 is a block diagram that shows a display screen having overlapping windows.

As an example, consider FIG. 8. There, a display screen such as one a user would see is shown generally at 800. A secure window 802 is provided and, in addition, a non-secure window 804 is shown to overlap with the bottom right corner of the secure window to define an overlapping region 806. One problem that can arise from a situation such as this is as follows. Region 806, when embodied on the video card's primary surface, does not include encrypted data. Yet, the adjacent region corresponding to the secure window 802 does contain encrypted data. If no adjustments are made to take this into account, then it is possible that the decryptor may decrypt the pixel data associated with overlapping region 806. As this pixel data was not encrypted to begin with, decrypting the data will provide erroneous data.

Accordingly, the embodiments about to be described provide methods and systems that enable per-pixel functionality. In one example, per pixel security can be provided.

Figure 9:
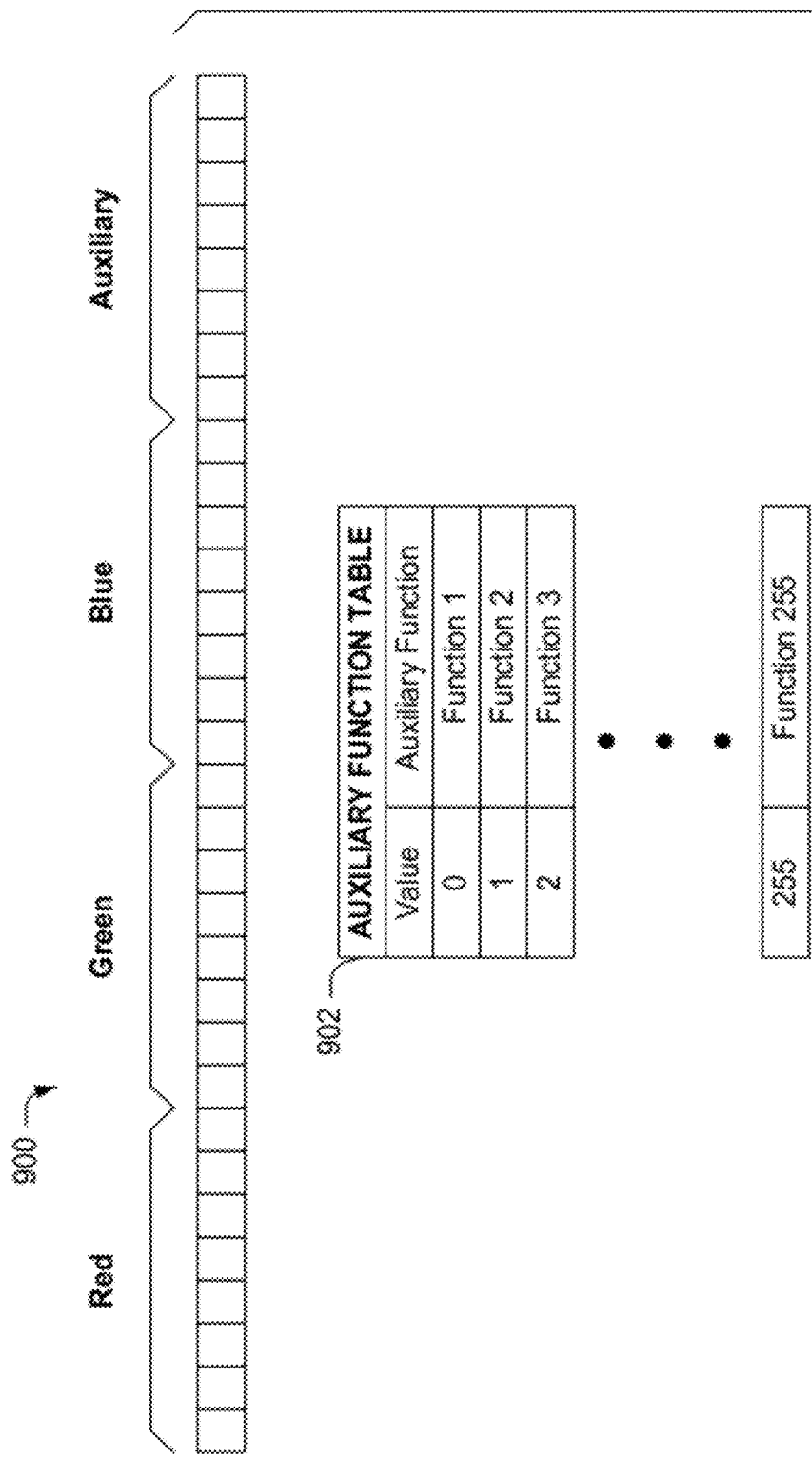
FIG. 9 is a diagram that shows exemplary pixel data and an associated auxiliary function table.

FIG. 9 shows a diagrammatic representation of pixel data generally at 900. In this example, the pixel data comprises 32 bits of data. The Red (R), Green (G), and Blue (B) values are indicated as eight bits each. It should be noted that while the illustrated pixel data comprises 32 bits per pixel, the pixel data can comprise more or less bits per pixel. Notice in this example, that eight bits are left over—here designated as "Auxiliary". In order to make memory accesses more efficient, GPUs prefer to read data in chunks that are multiples of powers of 2. Hence 24 bits data is read as 32 bit blocks, leaving 8 bits often 'unused' but always read and written with the 'used' bits. These auxiliary bits can be reused to specify various auxiliary functions that can be implemented in connection with individual pixels that are to be rendered to a display screen. Examples of auxiliary functions can include, without limitation, alpha or transparency information, depth information, region identification information, or color key information (to indicate regions to be substituted with other data).

Other common video formats use 16 bits per pixel instead of 24 or 32 bits per pixel. For example, RGB data can be stored as 5 bits per pixel, leaving a single bit unused that could be used to specify 2 auxiliary functions.

One way of implementing auxiliary functionality is to provide a table, such as table 902 that references or specifies the auxiliary functionality. For example, using eight bits to specific auxiliary functions can permit up to 256 auxiliary functions to be specified. Accordingly, when the pixel data is processed, the bits of pixel data pertaining to the auxiliary functions can be processed to access and implement various auxiliary functions.

Figure 10:
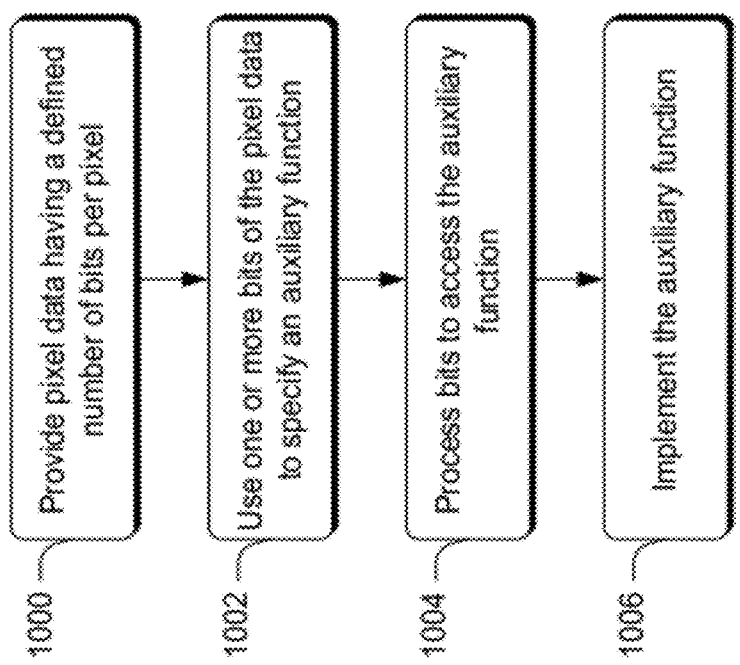
FIG. 10 is a flow diagram that describes steps in a method in accordance with one embodiment.

FIG. 10 is a flow diagram that describes steps in a method in accordance with one embodiment. The method can be implemented in any suitable hardware, software, firmware or combination thereof. In the present example, the method can be implemented, at least in part, by a suitably configured video card—an example of which is given above.

Step 1000 provides pixel data having a defined number of bits per pixel. In the FIG. 9 example, there are 32 bits per pixel. However, any suitable number of bits per pixel can be utilized. Step 1002 uses one or more bits of the pixel data to specify an auxiliary function. In the FIG. 9 example, eight bits are used to specify auxiliary functions through the use of the so-called "alpha channel" (the fourth 'unused' channel). By using the alpha channel's eight bits, 256 separate auxiliary functions be specified. Step 1004 processes the bits to access the auxiliary function. This step can be implemented by using the value of the auxiliary bits as an index into an auxiliary function table such as table 902 (FIG. 9). The table then references, for individual values, an auxiliary function that can be implemented in connection with the pixel data for a particular pixel. The reference in table 902 can be a pointer to software code that implements the auxiliary function, or it can comprise part of, or the entire auxiliary function itself. Step 1006 then implements the auxiliary function.

If the function 0 specified a null function, then old applications will automatically be compatible with the new scheme which utilizes the new auxiliary functions.

Per Pixel Security

Auxiliary bits of the pixel data can be used to provide decryption functionality at the pixel level. For example, assume that there is a secure region on the primary surface that is used for holding pixel data that is desired to be protected. This pixel data can be encrypted, at the pixel level, using an encryption key. Assume now that the auxiliary bits of the encrypted pixel data specify a decryption key can be utilized to decrypt the pixel data. Consider, for example, FIG. 11 which shows a per pixel auxiliary function table 1100. There, each value of the table is associated with a particular key. For example, value "1" is associated with "Key 1," value "2" is associated with "Key 2," and so on. Accordingly, when the auxiliary pixel data indicates that a particular key is associated with the pixel data, then the decryptor can access the associated key and use the key to decrypt the pixel data (typically 0). The auxiliary pixel data can also hold a value that indicates that the pixel data is not encrypted. In this case, the decryptor can simply pass the associated pixel data along to the display converter for further processing, allowing unencrypted data from applications to seamlessly integrate with the new scheme.

The per pixel key table can hold individual keys that can be used to decrypt the associated encrypted pixel data, or it can hold references to keys that can be used to decrypt the associated encrypted pixel data.

The table can also hold secondary (non-security) auxiliary related data such as alpha values. This allows selective reuse of values between security and the previous original use of the auxiliary channel. For examples, value 1 through 3 could be used to specify keys (with their own alpha value), while leaving values 0 and 4 through 255 still available for specifying their original alpha values.

FIG. 12 is a flow diagram that describes steps in a method in accordance with one embodiment. The method can be implemented in any suitable hardware, software, firmware or combination thereof. In the present example, the method can be implemented, at least in part, by a suitably configured video card—an example of which is given above.

Step 1200 encrypts pixel data that is associated with individual pixels. Advantageously the encryption can take place at the pixel level. This step can be implemented in any suitable way. For example, a secure application can cause the pixel data to be encrypted. Alternately, other processes can be utilized to encrypt the pixel data, examples of which are given above. Step 1202 associates auxiliary data with the pixel data. The auxiliary data specifies one or more decryption keys that can be used to decrypt the pixel data. In some cases, the auxiliary data can be considered to comprise the pixel data itself as it comprises a portion of the bits that comprise the pixel data (e.g. the alpha channel). Step 1204 receives the pixel data including any associated auxiliary data. This step can be implemented, for example, by a suitably configured decryptor. Step 1206 determines whether the pixel data needs to be decrypted. This step can be implemented by examining the auxiliary data. If the auxiliary data contains values that are associated with the decryption functionality, then decryption is necessary. If decryption is necessary, then step 1208 uses the auxiliary data to access a decryption key for the pixel data.

This step can be implemented by maintaining a table, such as table 1100, and using the table to access the appropriate decryption key. Step 1210 then decrypts the pixel data using the decryption key. If, on the other hand, step 1206 determines that decryption is not necessary, then step 1212 does not decrypt the data. The step can be implemented by assigning a particular value (e.g. 0) to the auxiliary data and using that value to indicate that decryption is not necessary. The data can then be passed along to the display converter for further processing.

One advantage of selective per pixel encryption is that applications can specify non-rectangular encryption regions. Each pixel within a rectangular region which is not encrypted, can be specified by the null encryption function (index 0).

Secondary Table

In addition to the above-described table, a so-called secondary table can be provided to contain additional information that is useful when processing pixel data. As an example, consider FIG. 13 where a secondary pixel table 1300 is shown. In this example, each pixel in a secure region of the primary surface can have an associated entry in this table. Thus, the "Pixel" column identifies a particular pixel region of the primary surface. In this example, table 1300 includes a "Process ID" column which can be used to identify a process or entity that "owns" the particular region. This column can be used, for example, to restrict access to the particular pixel data to only those entities that should have access.

Data Integrity

Additionally or alternately, table 1300 can be used to verify the integrity of the pixel data. For example, a hash can be computed of the unencrypted pixel data and stored in the "Expected Hash" column of table 1300. Then, when the pixel data is decrypted by, for example the decryptor, another hash can be computed of the decrypted pixel data and placed in the "Current Hash" column. By comparing the expected hash with the current hash, a secure application or the decryptor can ascertain whether any of the pixel data has been manipulated or changed. If, for example, a rogue application successfully manipulates the unencrypted pixel data, then the hash comparison will indicate that this has occurred. On the other hand, if a rogue application manipulates the encrypted pixel data, the data will decrypt differently. Then, when a current hash is computed for the decrypted data, the current hash will most assuredly not favorably compare with the expected hash. The decryption hardware can notify the application (or an agent on behalf of the application) of the data compromise. The notification could occur over a secure channel to the encrypting entity.

Other techniques can be utilized to ensure the integrity of the data in the secure regions. For example, an attacker may for some reason have per pixel addressability and thus be able to manipulate the pixel data (including the auxiliary data). To address this situation, a process can be implemented which, for every secure region, forces the auxiliary data to assume a value that will cause the data to be decrypted. Accordingly, this will minimize the effect of any rogue applications that attack the auxiliary data by, for example, changing the data to a value that will cause it to not be decrypted.

Some of the advantages of per pixel auxiliary functionality (including per pixel security include, without limitation, that the associated tables (e.g. the key table) are relatively small and cacheable. Further, no additional video bandwidth can be required when the auxiliary data comprises part of the bits that are already allocated for the pixel data (e.g. the alpha channel). In addition, alpha values can still be used in the event that the alpha channel is not used to support auxiliary functionality. Further, per pixel per frame key control can allow for complex key transitions. That is, keys can be cycled per frame, which can reduce issues when switching keys while playing the video. The above techniques can also be used with non-RGB data, with direct memory copies to the desktop, and with video overlays.

Lastly, when a region is moved, the auxiliary encryption index moves with the video data, ensuring that the encryption information is perfectly synchronized and does not require any additional hardware changes.

CONCLUSION

The various methods and systems described above supply a secure channel for software executing on a host computer, as well as address and provide solutions for an attack model in which rogue software executing on the host computer attempts to inappropriately obtain or otherwise manipulate data. Through techniques discussed herein, video data that is to be processed and rendered on a user's display can be kept confidential and, in many instances, the integrity of the data can be protected.

Although embodiments have been described in language specific to structural features and/or methodological steps, it is to be understood that embodiments defined in the appended claims are not necessarily limited to the specific features or steps described. Rather, the specific features and steps are disclosed as preferred forms of implementing the claimed embodiments.

What is claimed is:

1. A computer-implemented method, comprising:
processing pixel data by a computing device to reveal at least one auxiliary functionality specified by a value in unused auxiliary bits of the pixel data, the at least one auxiliary functionality identifying one or more of a process or an entity that has permission to access a portion of memory in which the pixel data is stored;
identifying the at least one auxiliary functionality based on the processed pixel data by correlating the value in the auxiliary bits to the corresponding auxiliary functionality of a plurality of auxiliary functionalities; and
causing the at least one auxiliary functionality to be implemented by restricting access to the pixel data to one or more of the process or the entity.

2. A computer-implemented method as described in claim 1, wherein the auxiliary functionality is revealed from auxiliary data included as part of the pixel data.

3. A computer-implemented method as described in claim 1, wherein the at least one auxiliary functionality is configured to be applied individually to one or more pixels of the pixel data.

4. A computer-implemented method as described in claim 1, wherein the at least one auxiliary functionality is specified in an alpha channel of the pixel data.

5. A computer-implemented method as described in claim 1, wherein the unused auxiliary bits specify at least one other auxiliary functionality that specifies, for the pixel data, one or more of alpha or transparency information, color depth information, video card memory region identification information, or color key information that identifies a region of video card memory data to be substituted with other data.

6. A computer-implemented method as described in claim 1, wherein said processing comprises:
accessing a table that associates bit values with the auxiliary functionalities; and
using bit values included in auxiliary bits of the pixel data as an index into the table to reveal the at least one auxiliary functionality from the auxiliary functionalities.

7. A computer-implemented method as described in claim 6, wherein the table includes a pointer to executable code that is executable to implement the at least one auxiliary functionality.

8. A computer-implemented method as described in claim 1, wherein the unused auxiliary bits specify at least one other auxiliary functionality that specifies a decryption key associated with encrypted pixel data included as part of the pixel data, and wherein said causing comprises accessing the decryption key and decrypting the encrypted pixel data using the decryption key.

9. A computer-implemented method as described in claim 8, wherein the decryption key is included as part of a table that matches bit values to decryption keys, and wherein said accessing comprises matching bit values included as part of the at least one other auxiliary functionality to bit values indicated in the table to identify the decryption key.

10. A computer-implemented method as described in claim 1, wherein the auxiliary bits are revealed as part of an unused channel of the pixel data.

11. A computer-implemented method, comprising:
ascertaining that pixel data includes unused auxiliary bits; and
specifying by a computing device one or more auxiliary functions using the unused auxiliary bits by applying at least one value to the unused auxiliary bits such that the one or more auxiliary functions are identifiable from the unused auxiliary bits based on the at least one value, the one or more auxiliary functions identifying one or more of a process or an entity that has permission to access a portion of memory in which the pixel data is stored such that access to the pixel data is restricted to one or more of the process or the entity.

12. A computer-implemented method as described in claim 11, wherein the auxiliary bits are included as part of an unused channel of the pixel data.

13. A computer-implemented method as described in claim 11, wherein the one or more auxiliary functions are configured to be applied individually to one or more pixels of a subset of the pixel data.

14. A computer-implemented method as described in claim 11, wherein the one or more auxiliary functions further specify at least one of color depth information, video card memory region identification information, or color key information that identifies a region of video card memory data to be substituted with other data.

15. A computer-implemented method as described in claim 11, wherein said specifying comprises associating data values of the auxiliary bits with the one or more auxiliary functions in a table that associates different data values with different auxiliary functions.

16. A computer-implemented method as described in claim 11, wherein the pixel data includes encrypted pixel data, and wherein the one or more auxiliary functions comprise data configured to be utilized to locate a decryption key for decrypting the encrypted pixel data.

17. A computer-implemented method, comprising:
associating auxiliary data with unused bits of encrypted pixel data by a computing device, the pixel data comprising color data;
using a first portion of the auxiliary data to specify alpha channel value information of the encrypted pixel data; and using a second portion of the auxiliary data to specify one or more auxiliary functions identifying one or more of a process or an entity that has permission to access a portion of memory in which the encrypted pixel data is stored such that access to the encrypted pixel data is restricted to one or more of the process or the entity.

18. A computer-implemented method as described in claim 17, further comprising:

decrypting the encrypted pixel data using a decryption key to generate decrypted pixel data;

generating a hash of the decrypted pixel data;

using at least a portion of the auxiliary data to identify a stored hash of pixel data that was encrypted to generate the encrypted pixel data; and comparing the hash of the decrypted pixel data with the stored hash to determine whether the encrypted pixel data is compromised.

19. A computer-implemented method as described in claim 17, wherein the second portion of the auxiliary data further specifies information that enables a decryption key to be accessed such that the encrypted pixel data can be decrypted using the decryption key.

20. A computer-implemented method as described in claim 17, wherein the one or more auxiliary functions are specified by associating data values of the auxiliary data with the one or more auxiliary functions in a table that associates different data values with different auxiliary functions.

* * * * *